US008709198B2

(12) United States Patent
Key

(10) Patent No.: US 8,709,198 B2
(45) Date of Patent: Apr. 29, 2014

(54) HIGH-SPEED EXPANDED CONTENT LABELS

(75) Inventor: Stephen Key, Modesto, CA (US)

(73) Assignee: SpinLabel Technologies, Inc., Boca Raton, FL (US)

( * ) Notice: Subject to any disclaimer, the term of this patent is extended or adjusted under 35 U.S.C. 154(b) by 0 days.

(21) Appl. No.: 13/301,746

(22) Filed: Nov. 21, 2011

(65) Prior Publication Data

US 2012/0125526 A1 May 24, 2012

Related U.S. Application Data

(60) Provisional application No. 61/458,299, filed on Nov. 22, 2010.

(51) Int. Cl.

| | |
|---|---|
| ***C09J 5/00*** | (2006.01) |
| ***B29C 65/52*** | (2006.01) |
| ***B32B 37/00*** | (2006.01) |
| ***B65C 3/06*** | (2006.01) |
| ***B65C 3/08*** | (2006.01) |

(52) U.S. Cl.
USPC .................................... 156/307.3; 156/307.7

(58) Field of Classification Search
USPC ........... 156/152, 247, 249, 277, 307.3, 307.7, 156/DIG. 5, DIG. 6, DIG. 8, DIG. 9, DIG. 10, 156/DIG. 11, DIG. 13
See application file for complete search history.

(56) References Cited

U.S. PATENT DOCUMENTS

| | | | | | |
|---|---|---|---|---|---|
| 3,779,829 | A | * | 12/1973 | Wolff | 156/361 |
| 3,865,671 | A | * | 2/1975 | Kronsder | 156/488 |
| 4,473,429 | A | * | 9/1984 | Crankshaw | 156/483 |
| 4,518,450 | A | * | 5/1985 | Warmann | 156/566 |
| 4,533,586 | A | * | 8/1985 | Roule et al. | 428/137 |
| 4,589,943 | A | * | 5/1986 | Kimball et al. | 156/256 |
| 4,680,080 | A | * | 7/1987 | Instance | 156/357 |
| 4,700,976 | A | * | 10/1987 | Loose | 283/101 |
| 4,727,667 | A | * | 3/1988 | Ingle | 40/306 |
| 5,017,261 | A | * | 5/1991 | Zodrow et al. | 156/568 |
| 5,048,870 | A | * | 9/1991 | Mangini et al. | 283/81 |
| 5,062,917 | A | * | 11/1991 | Zodrow | 156/568 |
| 5,078,826 | A | * | 1/1992 | Rogall | 156/451 |
| 5,215,622 | A | * | 6/1993 | Schmelzer | 156/566 |
| 5,263,743 | A | * | 11/1993 | Jones | 283/81 |
| 5,370,754 | A | * | 12/1994 | Soloman | 156/64 |
| 5,405,482 | A | * | 4/1995 | Morrissette et al. | 156/364 |
| 5,462,488 | A | * | 10/1995 | McKillip | 462/26 |
| 5,605,730 | A | * | 2/1997 | Treleaven | 428/40.1 |
| 5,727,819 | A | * | 3/1998 | Grosskopf et al. | 283/81 |
| 5,738,382 | A | * | 4/1998 | Grosskopf et al. | 283/81 |
| 5,741,381 | A | * | 4/1998 | Dolence et al. | 156/64 |
| 5,829,789 | A | * | 11/1998 | Treleaven et al. | 283/81 |
| 5,830,550 | A | * | 11/1998 | Treleaven et al. | 428/40.1 |
| 5,863,628 | A | * | 1/1999 | Barry | 428/40.1 |
| 5,975,582 | A | * | 11/1999 | Treleaven | 283/81 |
| 6,027,780 | A | * | 2/2000 | Treleaven et al. | 428/40.1 |
| 6,035,568 | A | * | 3/2000 | Grosskopf et al. | 40/630 |

(Continued)

*Primary Examiner* — Sing P Chan
(74) *Attorney, Agent, or Firm* — Carr & Ferrell LLP

(57) ABSTRACT

The present application is directed to methods for applying multiple labels to an object. An exemplary method comprises affixing an inner label to the object, then affixing an outer label over the inner label. One or more edges of the outer label may be coupled to the inner label using a releasable or a resealable adhesive such that the outer label may be decoupled from the inner label.

37 Claims, 13 Drawing Sheets

(56) References Cited

U.S. PATENT DOCUMENTS 6,048,423 A * 4/2000 Barrash et al. .................. 156/86
6,057,019 A * 5/2000 Barry ........................... 428/40.1
6,120,637 A * 9/2000 Barry ........................... 156/252
6,213,520 B1 * 4/2001 Treleaven et al. ............... 283/81
6,237,269 B1 * 5/2001 Key ............................... 40/638
6,270,121 B1 * 8/2001 Dolan et al. .................... 283/81
6,274,236 B1 * 8/2001 Shacklett et al. ............. 428/354
6,328,832 B1 * 12/2001 Otruba et al. ................... 156/64
6,329,034 B1 * 12/2001 Pendry et al. ................ 428/40.1
6,398,263 B2 * 6/2002 Treleaven et al. ............... 283/81
6,402,872 B1 * 6/2002 Key .............................. 156/215
6,413,345 B1 * 7/2002 Treleaven ..................... 156/227
6,428,639 B1 * 8/2002 Oldenburg et al. ............. 156/64
6,431,241 B1 * 8/2002 Gonzalo ....................... 156/518
6,550,171 B1 * 4/2003 De Werra et al. ............... 40/638
6,550,512 B2 * 4/2003 Yang ............................ 156/351
6,561,246 B2 * 5/2003 Yang ............................ 156/360
6,575,216 B2 * 6/2003 Yang ............................ 156/351
6,616,189 B2 * 9/2003 Raming .......................... 283/81
6,631,578 B2 * 10/2003 Key ............................... 40/638
6,669,804 B2 * 12/2003 Pendry et al. ................. 156/252
6,737,137 B2 * 5/2004 Franko et al. ................ 428/40.1
6,752,431 B1 * 6/2004 Matthews et al. ............... 283/81
6,755,442 B2 * 6/2004 Franko et al. ................... 283/94
6,786,515 B2 * 9/2004 Franko, Sr. ..................... 283/81
6,793,755 B2 * 9/2004 Schaupp et al. .............. 156/215
6,811,640 B2 * 11/2004 Franko, Sr. ................... 156/204
7,087,298 B2 * 8/2006 Key .............................. 428/343
7,172,220 B2 * 2/2007 Franko, Sr. ..................... 283/81
7,172,668 B2 * 2/2007 Key ............................... 156/86
7,179,514 B2 * 2/2007 Olsen et al. .................. 428/40.1
7,601,410 B2 * 10/2009 Matthews et al. ............ 428/40.1
7,875,142 B2 * 1/2011 Matthews et al. ............. 156/156
7,926,851 B2 * 4/2011 Kaufman ........................ 283/81
8,043,993 B2 * 10/2011 Roth et al. .................... 503/204
8,142,596 B1 * 3/2012 Valenti et al. ................. 156/249
8,245,752 B2 * 8/2012 Lingier et al. ................ 156/556
2001/0004152 A1 * 6/2001 Treleaven et al. ............... 283/81
2001/0017181 A1 * 8/2001 Otruba et al. ................... 156/64
2001/0025442 A1 * 10/2001 Key ............................... 40/638
2001/0045741 A1 * 11/2001 Shacklett et al. ............... 283/81
2002/0015813 A1 * 2/2002 Pendry et al. ................ 428/41.8
2002/0017784 A1 * 2/2002 Merry et al. .................... 283/81
2002/0038685 A1 * 4/2002 Key .............................. 156/184
2002/0096261 A1 * 7/2002 Yang ............................ 156/352
2002/0096262 A1 * 7/2002 Yang ............................ 156/360
2002/0096264 A1 * 7/2002 Yang ............................ 156/556
2002/0130182 A1 * 9/2002 Mondie ......................... 235/468
2002/0185212 A1 * 12/2002 Schaupp et al. .............. 156/205
2002/0193225 A1 * 12/2002 Raming ........................ 493/375
2003/0006606 A1 * 1/2003 Franko et al. ................... 283/81
2003/0015105 A1 * 1/2003 Dewig et al. .................... 101/35
2003/0030270 A1 * 2/2003 Franko et al. ................... 283/94
2003/0091819 A1 * 5/2003 Franko, Sr. ................... 428/343
2003/0118768 A1 * 6/2003 Sellars ......................... 428/40.1
2003/0175463 A1 * 9/2003 Olsen et al. .................. 428/40.1
2003/0189490 A1 * 10/2003 Hogerton et al. .......... 340/572.8
2004/0123565 A1 * 7/2004 Rice et al. ....................... 53/415
2004/0166277 A1 * 8/2004 Key ............................. 428/41.8
2004/0197513 A1 * 10/2004 Shacklett et al. ............ 428/40.1
2004/0207193 A1 * 10/2004 Franko, Sr. ..................... 283/81
2005/0181165 A1 * 8/2005 Franko, Sr. .................. 428/41.8
2005/0190914 A1 * 9/2005 Chen et al. .................... 380/201
2006/0029761 A1 * 2/2006 Matthews et al. ............ 428/40.1
2006/0078701 A1 * 4/2006 Glasier ........................ 428/40.1
2006/0145471 A1 * 7/2006 Franko, Sr. ................... 283/101
2007/0034103 A1 * 2/2007 Kaufman ...................... 101/483
2007/0209753 A1 * 9/2007 Gonzalez et al. ............. 156/212
2007/0209755 A1 * 9/2007 Smith ........................... 156/249
2007/0213214 A1 * 9/2007 Roth et al. .................... 503/226
2007/0221319 A1 * 9/2007 Morgan ........................ 156/249
2007/0252379 A1 * 11/2007 Bethune et al. .................. 283/81
2008/0003391 A1 * 1/2008 Franko et al. ................ 428/40.1
2008/0003410 A1 * 1/2008 Shacklett et al. ............. 428/189
2008/0014344 A1 * 1/2008 Fort et al. ................... 427/207.1
2008/0073902 A1 * 3/2008 Franko .......................... 283/101
2008/0303264 A1 * 12/2008 Kaufman ........................ 283/81
2008/0303265 A1 * 12/2008 Kaufman ........................ 283/81
2009/0236023 A1 * 9/2009 Lingier et al. .................. 156/60
2009/0255623 A1 * 10/2009 Bagung et al. ................ 156/230
2010/0044438 A1 * 2/2010 Chen et al. ............... 235/462.01
2010/0084077 A1 * 4/2010 Matthews et al. ............. 156/152
2010/0101681 A1 * 4/2010 Kramer et al. .................. 141/98
2010/0240133 A1 * 9/2010 Brivanlou et al. ............ 435/465
2010/0295916 A1 * 11/2010 Kaufman ...................... 347/171
2010/0300599 A1 * 12/2010 Fort et al. ........................ 156/60
2010/0307947 A1 * 12/2010 Marden et al. ............. 206/459.5
2011/0151115 A1 * 6/2011 Lingier ...................... 427/207.1
2011/0233095 A1 * 9/2011 Seidl .......................... 206/459.5
2012/0037299 A1 * 2/2012 Baeta et al. ................... 156/192
2012/0125526 A1 * 5/2012 Key ............................. 156/152
2012/0268837 A1 * 10/2012 Rittenburg et al. ........... 359/742
2012/0279632 A1 * 11/2012 Lingier et al. .................. 156/60

* cited by examiner

HIGH-SPEED EXPANDED CONTENT LABELS

CROSS-REFERENCE TO RELATED APPLICATIONS

This present application claims the benefit and priority of U.S. provisional patent application No. 61/458,299, entitled “High-Speed, Low Cost Expanded Content Label,” filed on Nov. 22, 2010, which is incorporated herein by reference in its entirety.

FIELD OF THE INVENTION

The present invention is directed generally to labels, and more specifically to methods of applying multiple high-speed expanded content labels to an object.

SUMMARY

The present application is directed to methods for applying multiple labels to an object. An exemplary method comprises affixing an inner label to the object. A non-resealable adhesive may be applied to a leading edge of an outer label. The outer label leading edge may be affixed to the inner label. A resealable adhesive may be applied to a trailing edge of the outer label, and the outer label trailing edge may be releasably coupled to the outer label leading edge. At least a portion of the inner label may be obscured from view.

DETAILED DESCRIPTION

The present application is directed to methods for applying multiple labels to an object. An exemplary method comprises affixing an inner label to the object using adhesive from a first adhesive application device. A non-resealable adhesive or a breakaway adhesive from a second adhesive application device may be applied to a leading edge of an outer label. The outer label leading edge may be affixed to the inner label. A resealable adhesive from a third adhesive application device may be applied to a trailing edge of the outer label, and the outer label trailing edge may be releasably coupled to the outer label leading edge. At least a portion of the inner label may be obscured from view.

Figure 1:
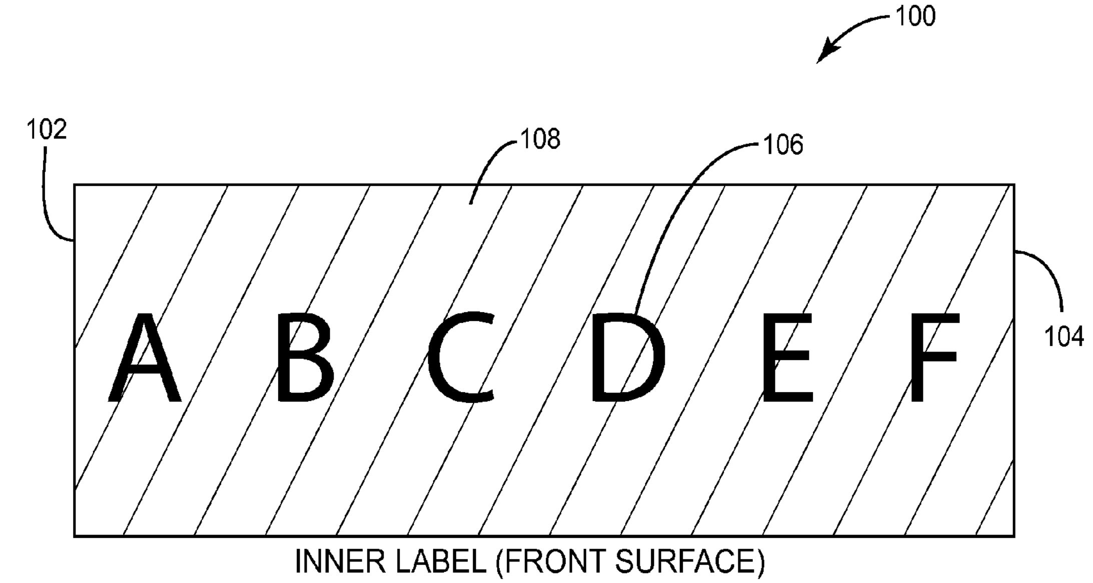
FIG. 1 is a front view of an exemplary label according to various embodiments.

FIG. 1 illustrates various embodiments of a front surface 108 of an inner label 100 for an object according to various embodiments. The inner label 100 comprises a leading edge 102 and a trailing edge 104. While the leading edge 102 is oriented to the left and the trailing edge is oriented to the right as presented in FIG. 1, the orientation of the leading edge 102 and the trailing edge 104 could be reversed depending on which edge is first applied to the object. Both orientations are within the scope of the present disclosure. Inner label front surface 108 may comprise writing or other indicia 106 thereon.

As used herein, the leading edge refers to the first edge to be affixed to the object and the trailing edge refers to the second edge to be affixed to the object of the overlapping leading edge. Depending on the orientation of the label and the container when the label is affixed to the object, either edge of the label may be the leading edge. The orientations presented in the figures are for convenience and are not intended to be limiting in any way.

Figure 2:
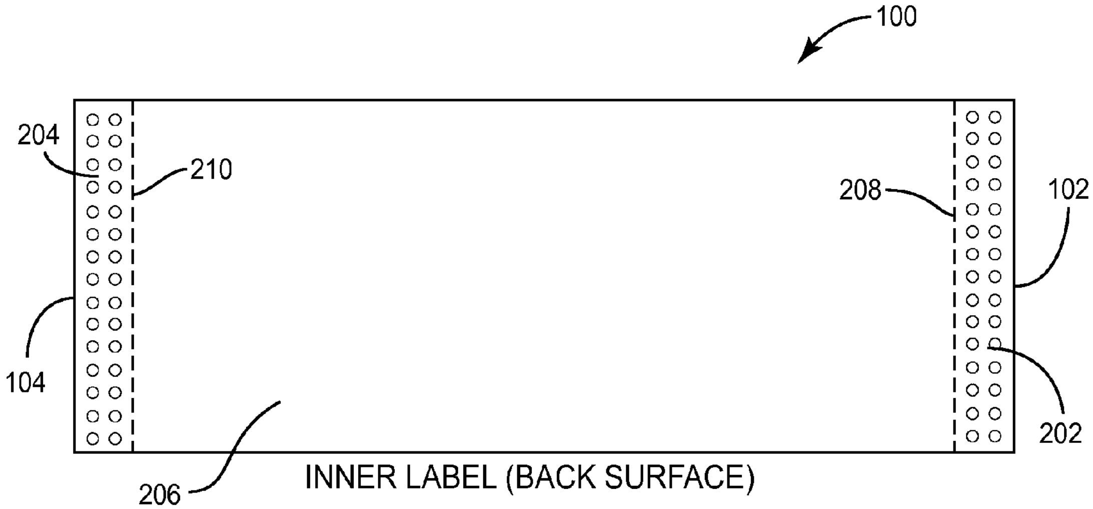
FIG. 2 is a back view of an exemplary label according to various embodiments.

FIG. 2 illustrates various embodiments of a back surface 206 of the inner label 100. In various embodiments, the inner label back surface 206 comprises two strips of adhesive 202 and 204 on or immediately adjacent to the leading and trailing edges, 102 and 104, respectively. Inner label leading edge adhesive 202 may have a boundary 208 defined as its limit on the inner label back surface 206. Inner label trailing edge adhesive 204 may also have a boundary 210. While FIG. 2 illustrates that the adhesive strips 202 and 204 are generally close to the inner label leading and trailing edges 102 and 104, respectively, it is understood that the adhesive strips 202 and 204 may be continuous or discontinuous, and may extend across any portion of the inner label back surface 206, including the entire inner label back surface 206. In various embodiments, a length of the inner label 100 may be selected to be slightly longer than a circumference of the object on which it is placed, such that the trailing edge 104 overlaps the leading edge 102, and the trailing edge 104 is affixed to the leading edge 102. In various embodiments, the length of the inner label 100 may be selected to be approximately the same as the circumference of the object on which it is placed, such that the leading edge 102 and the trailing edge 104 do not overlap.

Figure 3:
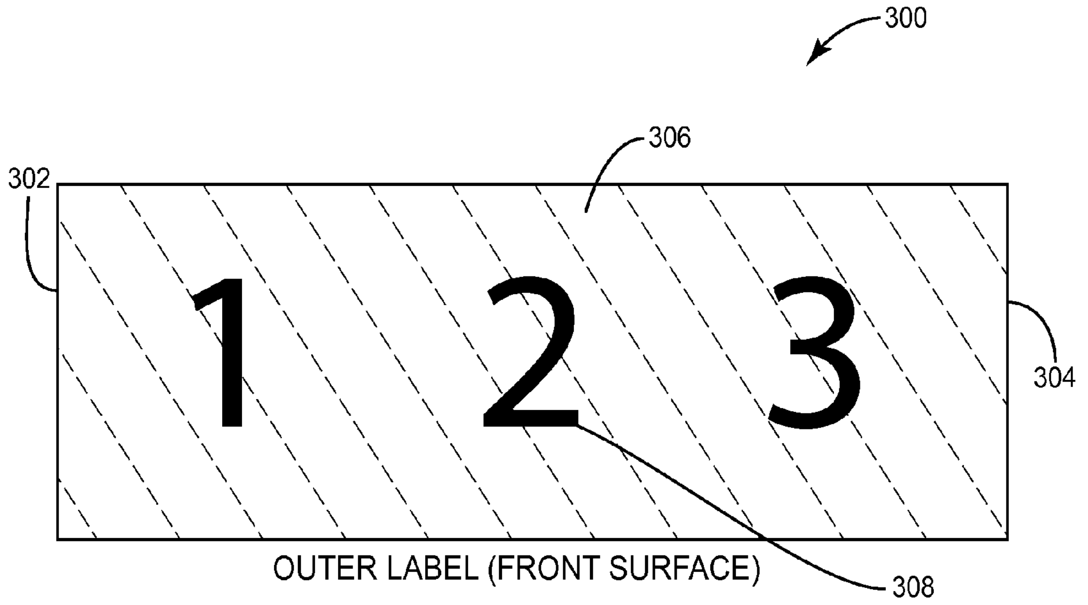
FIG. 3 is a front view of an exemplary label according to various embodiments.

FIG. 3 illustrates various embodiments of a front surface 306 of an outer label 300. Outer label 300 comprises a leading edge 302 and a trailing edge 304, and indicia 308 may be imprinted on the outer label front surface 306.

Figure 4:
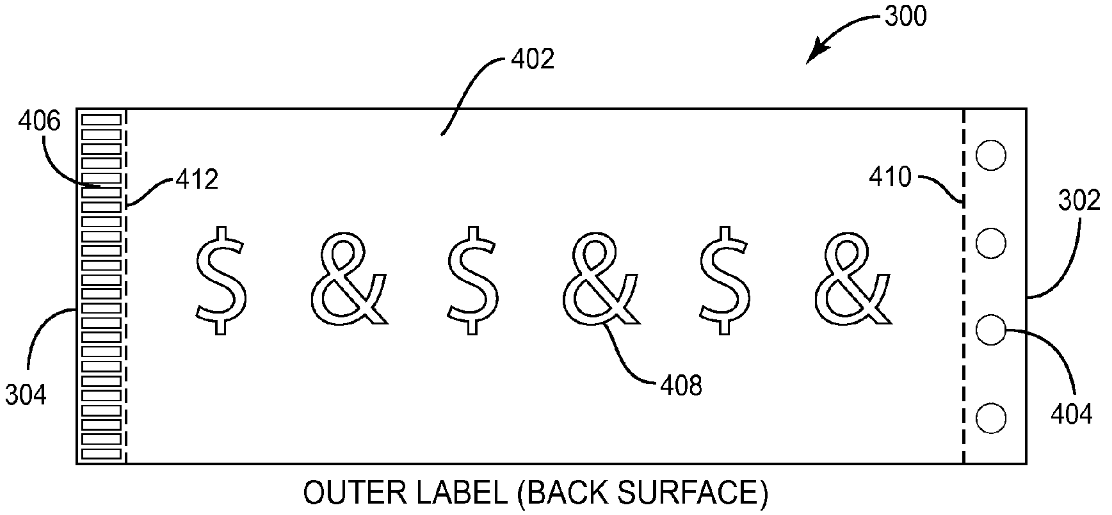
FIG. 4 is a back view of an exemplary label according to various embodiments.

Various embodiments of a back surface 402 of the outer label 300 are illustrated in FIG. 4. The outer label back surface 402 may comprise various indicia 408 printed thereon, as well as two strips of adhesive 404 and 406 on or immediately adjacent to the leading and trailing edges, 302 and 304, respectively. Outer label leading edge adhesive 404 may have a boundary 410 defined as its limit on the outer label back surface 402. Outer label trailing edge adhesive 406 may also have a boundary 412. While FIG. 4 illustrates that the adhesive strips 404 and 406 are generally close to the outer label leading and trailing edges 302 and 304, respectively, it is understood that the adhesive strips 404 and 406 may be continuous or discontinuous, and may extend across any portion of the outer label back surface 402, including the entire outer label back surface 402. In various embodiments, the adhesive strips 404 and 406 are confined to areas near the leading and trailing edges 302 and 304, respectively, so as not to obscure or interfere with the outer label back surface indicia 408.

The inner label adhesive 202, 204 and the outer label adhesive 404, 406 may be applied in a variety of patterns as can be appreciated by one skilled in the art. The adhesive 202, 204, 404, 406 may be applied in in strips, dots, droplets, circles, rectangles, squares, triangles, lines, and the like, as well as combination of patterns.

A length of the outer label 300 may be selected to be slightly longer than a circumference of the object on which it is placed, such that the outer label trailing 304 overlaps the outer label leading edge 302, and the outer label trailing edge 304 is affixed to the outer label leading edge 302. In various embodiments, the length of the outer label 300 may be selected to be approximately the same as the circumference of the object on which it is placed, such that both the leading edge 302 and the trailing edge 304 do not overlap and are affixed to the inner label front surface 108.

Figure 5A:
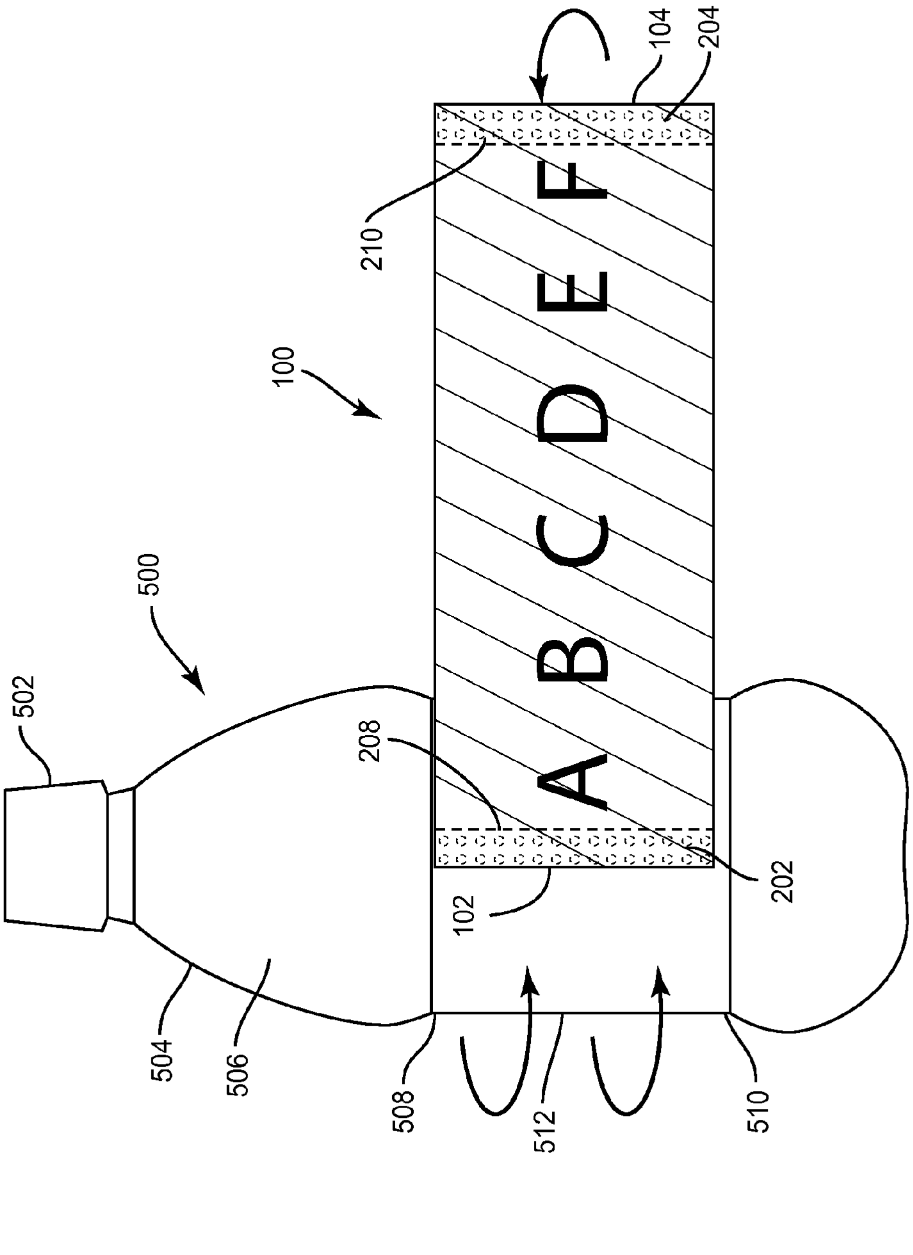
FIG. 5A illustrates a leading edge of an exemplary label affixed to a container according to various embodiments.

FIG. 5A illustrates the application of the inner label 100 to an exemplary container 500 according to various embodiments. The container 500 may be a glass or plastic bottle, or other type of container such as a metal can or a cardboard receptacle. The container may be round, rectangular, square, or any other shape known in the art. The term "container" is used here for convenience to describe exemplary embodiments. It is understood that the container may be any object, including non-containers. Container 500 may comprise a cap 502 removably secured to a body 504. Various embodiments of the body 504 may have an exterior surface 506 that comprises a top label panel 508, a bottom label panel 510, and a recessed surface 512 interposed between the top label panel 508 and the bottom label panel 510. As discussed below, the inner label 100 may be applied to the container 500 at the recessed area 512 between the top label panel 508 and the bottom label panel 510.

In various embodiments, the outer label 300 may be rotatable about the inner label 100, as discussed below. In these embodiments, the top label panel 508 and bottom label panel 510 may function to restrict upward and downward movement of the outer label 300 in relation to the container 500 such that the outer label 300 generally remains in a position covering the inner label 100. The top label panel 508 and bottom label panel 510 may be excluded from embodiments in which the outer label does not rotate, although such exclusion is not required.

Figure 5B:
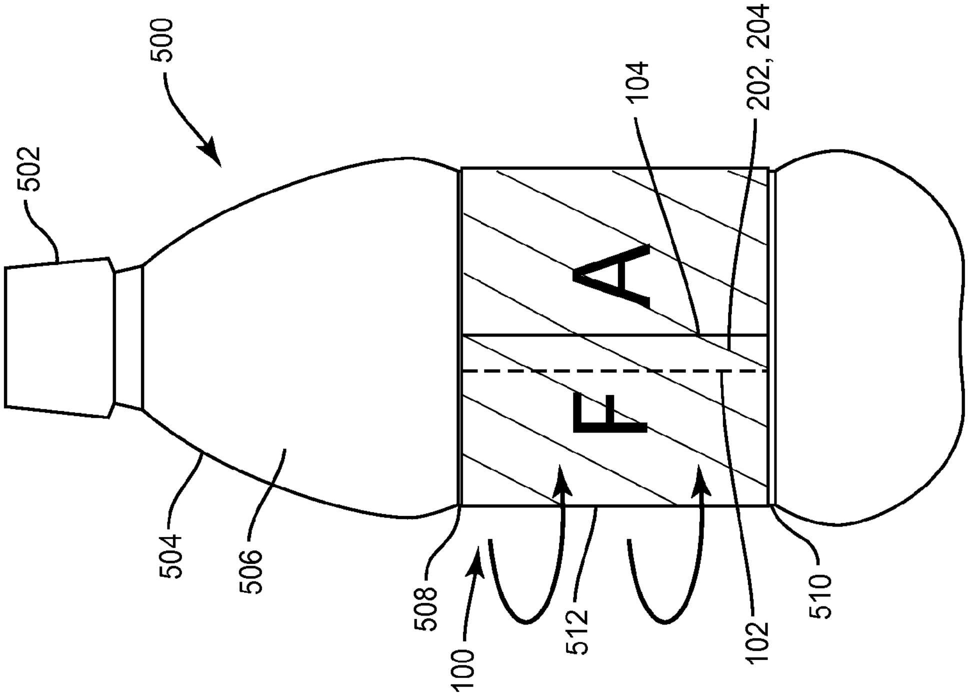
FIG. 5B illustrates an exemplary label secured about a container according to various embodiments.

FIG. 5B illustrates the container 500 with the inner label 100 affixed to the container 500. Initially, as illustrated in FIG. 5A, inner label leading edge 102 is placed in contact with the recessed surface 512 of the container 500 and affixed to the container 500 by the leading edge adhesive strip 202. With relative motion between the container 500 and the inner label 100, the inner label 100 may be wrapped around the container 500 with the inner label trailing edge 104 now overlapping the inner label leading edge 102 such that the leading edge adhesive strip 202 holds the inner label leading edge 102 to the container 500 while the trailing edge adhesive strip 204 holds the inner label trailing edge 104 to the overlapped inner label leading edge 102.

Figure 6:
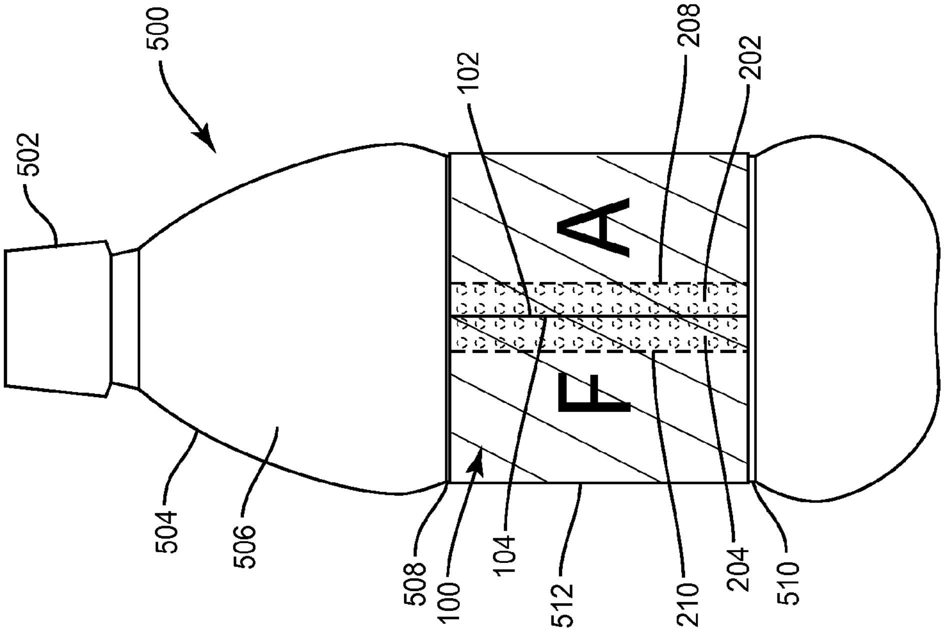
FIG. 6 illustrates an exemplary label secured about a container according to various embodiments.
Figure 7:
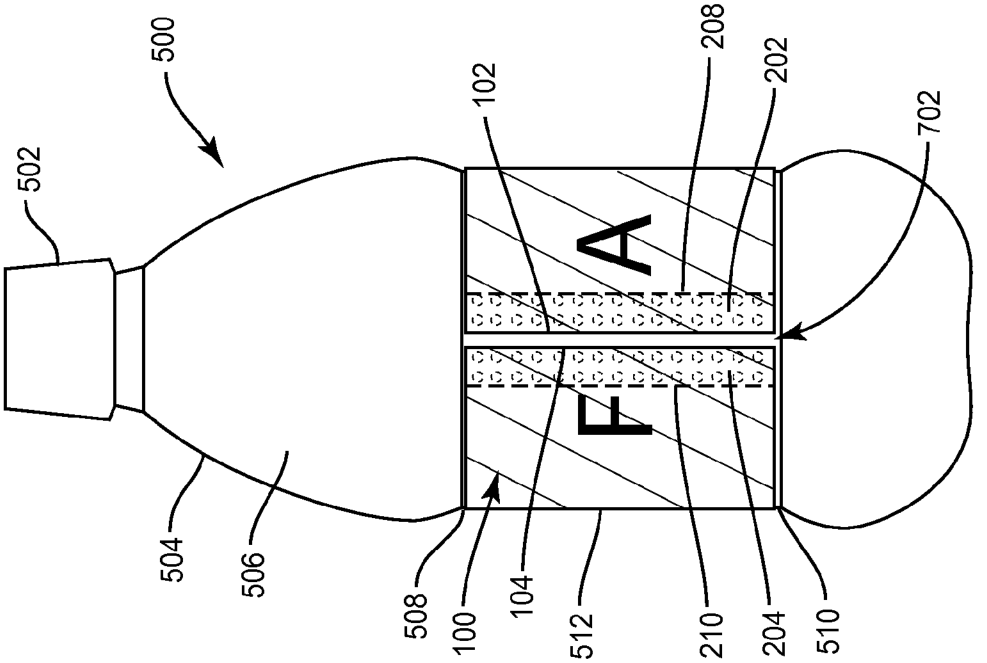
FIG. 7 illustrates an exemplary inner label secured about a container according to various embodiments.

In various embodiments as illustrated in FIG. 6, the length of the inner label 100 may be substantially the same as a circumference of the recessed surface 512 of the container 500, which may allow the inner label leading edge 102 and inner label trailing edge 104 to abut rather than overlap. However, it is also possible that the length of the inner label 100 may be shorter than the circumference of the recessed surface 512, resulting in a gap 702 between the inner label leading edge 102 and the inner label trailing edge 104 when the inner label is affixed to the recessed surface as illustrated in FIG. 7. In both of these instances, the inner label trailing edge adhesive strip 204 may adhere to the recessed surface 512 of the container 500, rather than the inner label leading edge 102.

In various embodiments, the inner label adhesive strips 202, 204 may be comprised of a permanent adhesive. In general, a permanent adhesive is one that does not readily release from a surface to which it adheres after the adhesive dries or cures. Using the inner label 100 as an example, the permanent adhesive 202, 204 will tend not to release from the recessed surface 512, nor will it tend to release the inner label leading edge 102 or trailing edge 104 once dried or cured. In order to remove the inner label from the recessed surface 512, the inner label 100 may have to be torn from the adhesive, or the adhesive layer 202, 204 may have to be fractured which may leave some of the adhesive on the recessed surface 512 and some of the adhesive on the inner label leading edge 102 or trailing edge 104. Once the surfaces affixed with the permanent adhesive are separated, they may not be reattached.

Figure 8:
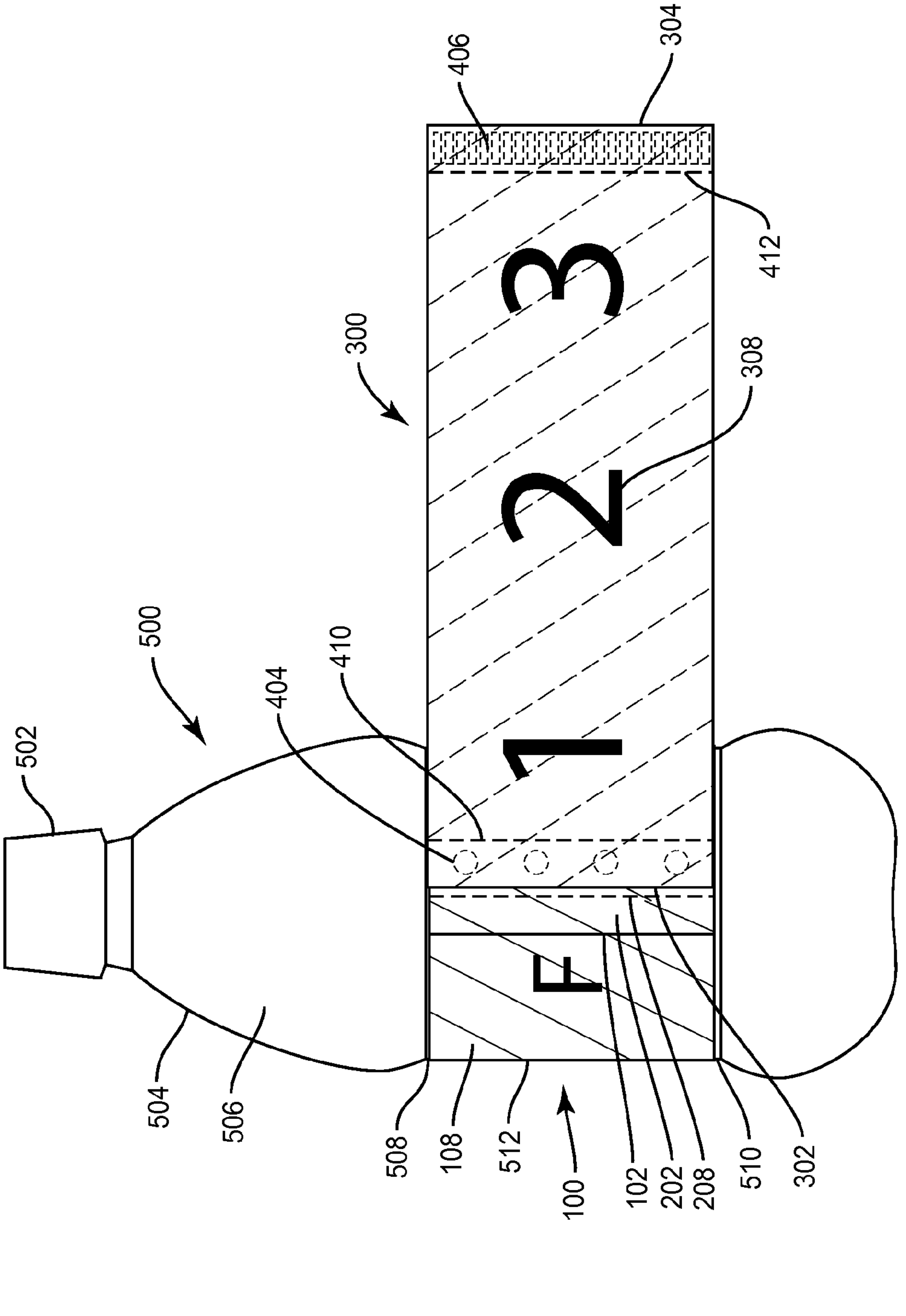
FIG. 8 illustrates a leading edge of an exemplary outer label affixed to an exemplary inner label according to various embodiments.

FIG. 8 illustrates the container 500 with the inner label 100 already affixed to the recessed surface 512. In various embodiments, the outer label 300 may be mounted over the inner label 100 on the container 500, thereby obscuring at least a portion of the inner label 100 from view. In various embodiments, the entire inner label 100 is obscured from view when the outer label 300 is mounted over the inner label 100. The outer label 300 may be wider than the inner label 100, although in certain embodiments a width of the outer label 300 may be equal to or less than a width of the inner label 100.

FIG. 8 illustrates the application of the outer label 300 over the inner label 100 on the container 500 according to various embodiments. The outer label leading edge 302 may be placed in contact with any portion of the inner label front surface 108 and affixed to the inner label front surface 108 by the outer label leading edge adhesive strip 404. With relative motion between the container 500 and the outer label 300, the outer label 300 may be wrapped around the container 500 with the outer label trailing edge 304 now overlapping the outer label leading edge 302 such that the outer label leading edge adhesive strip 404 holds the outer label leading edge 302 to the inner label 100 while the outer label trailing edge adhesive strip 406 holds the outer label trailing edge 304 to the overlapped outer label leading edge 302.

As described previously for the inner label 100, in various embodiments a length of the outer label may be selected such that the outer label trailing edge 304 overlaps the outer label leading edge 302. A different length may be selected for the outer label 300 such that the outer label leading edge 302 and trailing edge 304 abut when mounted on the container, or that a gap is formed between the outer label leading edge 302 and trailing edge 304.

Figure 9:
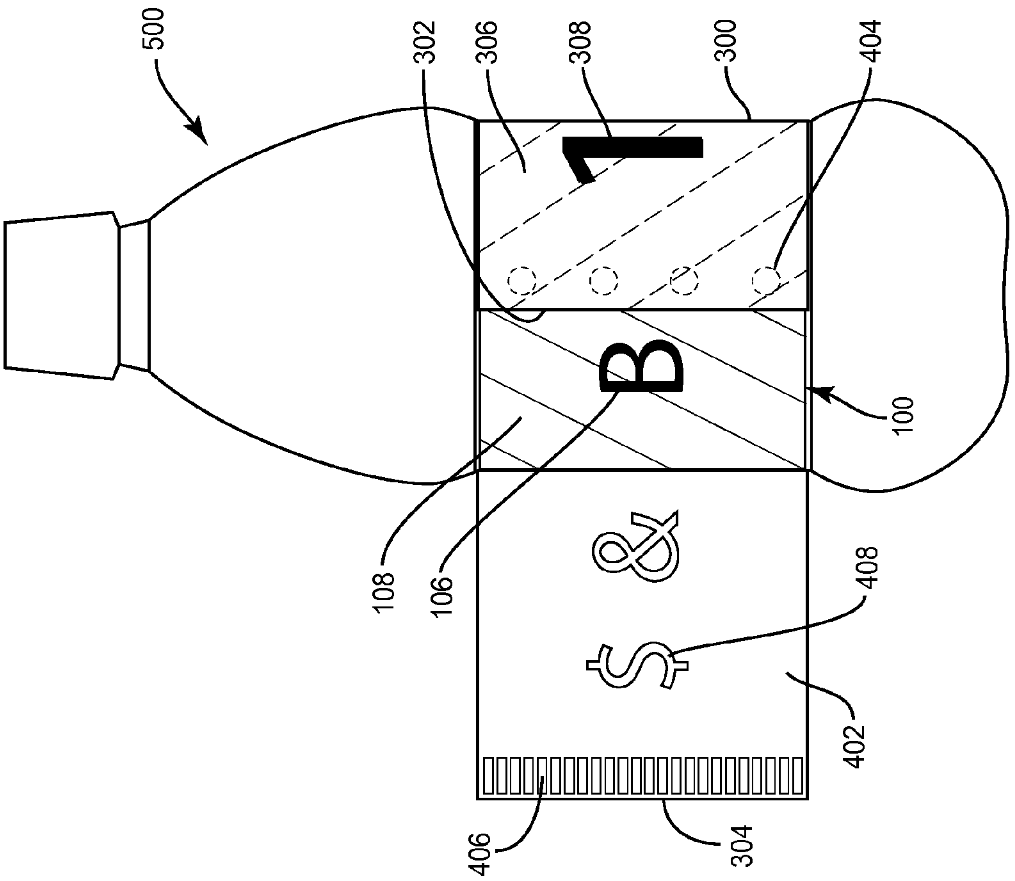
FIG. 9 illustrates an exemplary outer label affixed to an exemplary inner label and partially wrapped about a container according to various embodiments.

FIG. 9 illustrates the operation of the inner label 100 and the outer label 300 according to various embodiments. Beginning with the container 500 with the inner label 100 and the outer label 300 in place as shown, for example, in FIG. 6, the outer label trailing edge 304 may be detached from the outer label leading edge 302 and at least partially peeled back as shown in FIG. 9. The combination of the inner label 100 and the outer label 300 in this configuration effectively triples the amount of surface area available for viewing by a consumer or user of the container 500. Prior to detaching the outer label trailing edge 304, the consumer may view the outer label front surface 306. Upon detaching the outer label trailing edge 304, the consumer may now view the outer label back surface 402 and the inner label front surface 108 in addition to the outer label front surface 306.

One of at least three types of adhesive may be used for the outer label leading edge adhesive 404. A first type of adhesive is the permanent adhesive as described above for the inner label 100. When a permanent adhesive is used for the outer label leading edge adhesive 404, the outer label leading edge generally cannot be detached without inflicting damage to one or both of the outer label 300 or the inner label 100. This may be desirable for various embodiments where the outer label 300 is not intended to be removed from the container 500.

A second type of adhesive that may be used for the outer label leading edge adhesive 404 is a releasable adhesive. A releasable adhesive is one that will release from a surface to which it is attached once a sufficient mechanical force is applied. A releasable adhesive may be used when the outer label back surface 402 comprises a coupon for a subsequent purchase of a product. The releasable adhesive may allow the consumer to easily remove the outer label 300 for later use. In various embodiments, the releasable adhesive may be a breakaway adhesive. A breakaway adhesive may have limited ability to withstand shear stresses. Shear stresses may cause the adhesive bond created between the label (e.g., outer label 300) and the surface to which it is affixed (e.g., the inner label 100 or container 500) to fail along the adhesive. In general, a releasable or breakaway adhesive may not re-attach to a surface once removed.

A third type of adhesive that may be used for the outer label leading edge adhesive 404 is a resealable adhesive. A resealable adhesive may release from a surface to which it is attached once a sufficient mechanical force is applied, similar to the releasable adhesive described above. However, the resealable adhesive may be re-attached to a surface by applying pressure. A resealable adhesive may be desirable when the outer label back surface 402 or the inner label front surface 108 comprise information that may be needed only on occasion. Thus, the consumer or user may detach the outer label 300 when the information is needed, then re-attach the outer label 300.

In various embodiments, the outer label trailing edge adhesive 406 may be a releasable adhesive or a resealable adhesive, depending on the intended use of the outer label 300. As described above, if the surfaces 108, 402 comprise information that is intended to stay with the container, the outer label trailing edge adhesive 406 may be a resealable adhesive. In contrast, if the outer label 300 is intended to be removed from the container 500, a releasable adhesive may be desirable.

Figure 10:
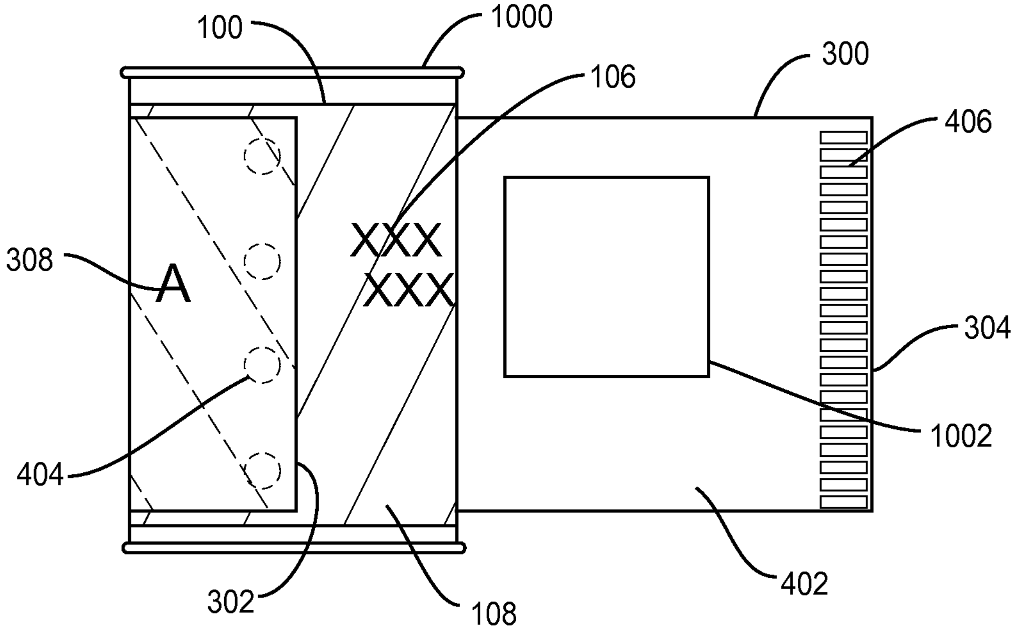
FIG. 10 illustrates an exemplary outer label with a window affixed to an exemplary inner label and partially wrapped about a container according to various embodiments.

FIG. 10 illustrates various embodiments of the outer label 300 comprising a window 1002. The window 1002 may comprise a void in the outer label 300 such that a portion of the inner label 100 may be visible through the window. In various embodiments, the window 1002 may have a transparent covering (not shown). In various other embodiments, the window may comprise a transparent section of the outer label 300 itself rather than a void. FIG. 10 illustrates the outer label 300 partially wrapped about a container 1000, and inner label 100 already in place on the container 1000. As shown, the outer label leading edge adhesive 404 maintains the outer label 300 coupled to the inner label 100. The outer label 300 may then be moved from the position illustrated in FIG. 10 to the position illustrated in FIG. 11 to secure the outer label 300 about the container 1000. Outer label trailing edge adhesive 406 may couple to the outer label leading edge 302 if the outer label leading edge 302 and trailing edge 304 overlap; otherwise, the outer label trailing edge adhesive 406 may be coupled to the inner label front surface 108.

Figure 11:
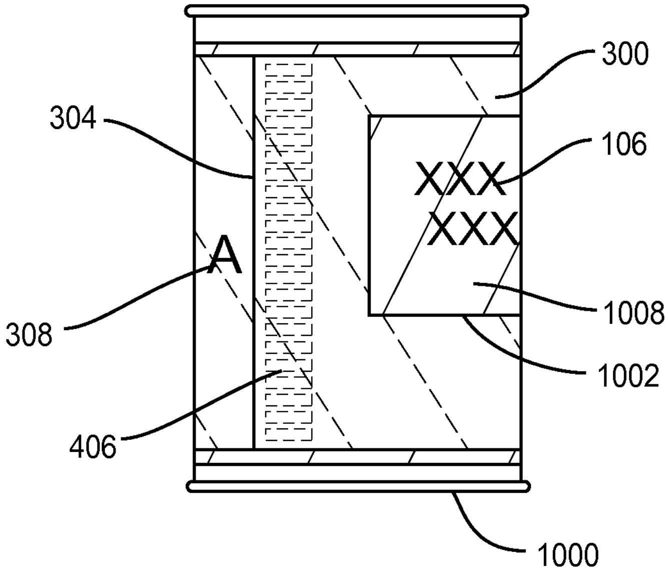
FIG. 11 illustrates an exemplary outer label with a window secured about a container and a portion of an inner label visible through the window according to various embodiments.

Once the outer label 300 is in position on the container 1000 as illustrated in FIG. 11, at least a portion of the inner label front surface indicia 106 may be visible through the window 1002. This may allow viewing of a first portion of the inner label 100 without removing the outer label 300. In various embodiments, the outer label leading edge adhesive 404 may be a breakaway adhesive. Rotation of the outer label 300 relative to the inner label 100 may exert shear stresses on the breakaway adhesive, causing the adhesive bond affixing the outer label leading edge 302 to the inner label 100 to fail. The outer label 300 may then be freely rotatable about the inner label, and a second portion of the inner label 100 may be visible when the outer label 300 is rotated to a second position. The window 1002 may be rectangular as illustrated in FIGS. 10 and 11, or any other shape as needed for a particular application. For example, the window 1002 may be a slit that reveals an alphanumeric string on the inner label 100. In various embodiments, the outer label 300 may comprise more than one window 1002. Various embodiments in which the outer label trailing edge adhesive 406 is a resealable or releasable adhesive may allow the outer label to be peeled back to reveal the outer label back surface 402 and the entire inner label front surface 108 or to be removed from the container 1000, in addition to being rotatable.

Figure 12:
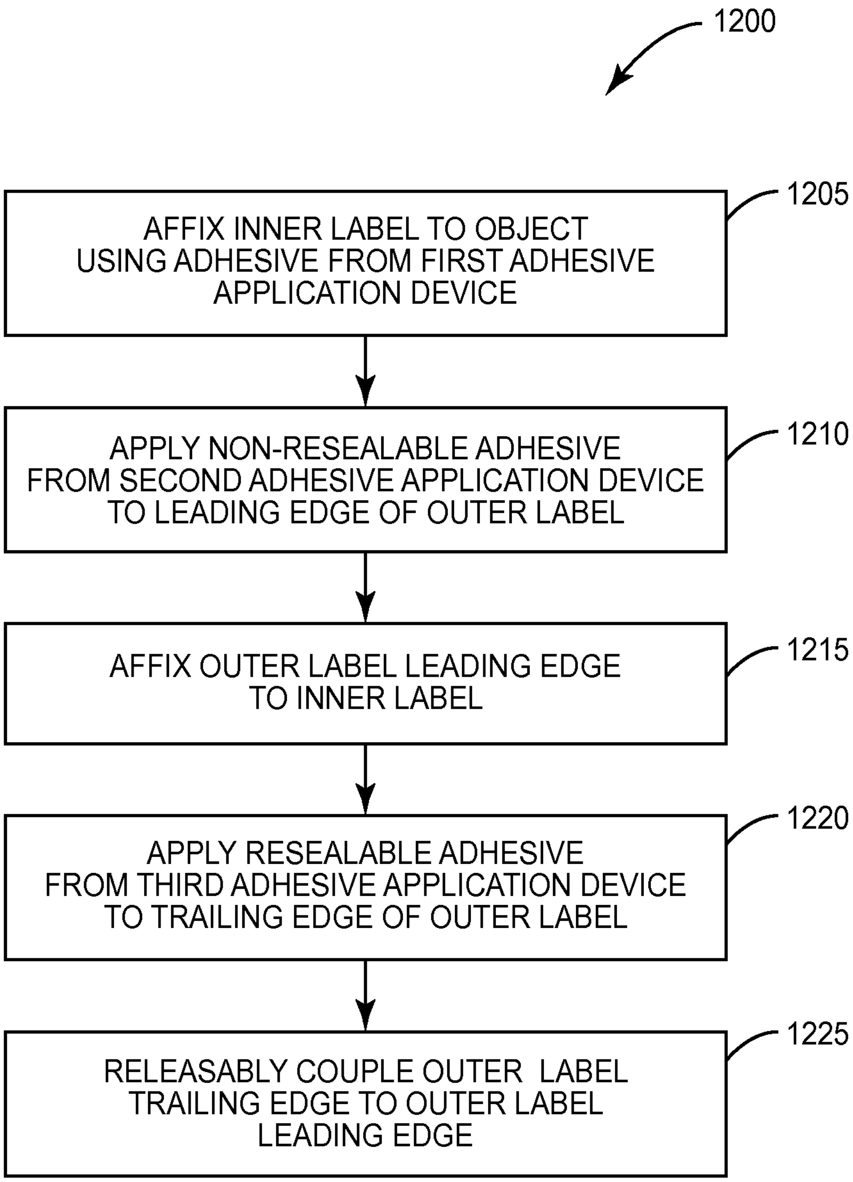
FIG. 12 is an exemplary flow diagram of a method for applying multiple labels to an object according to various embodiments.

FIG. 12 illustrates a general flow chart of various embodiments of a method 1200 for applying multiple labels to an object. The method 1200 may be employed with roll-fed labels. An inner label 100 may be affixed to an object, such as a container 500, using adhesive from a first adhesive application device (step 1205). In various embodiments, the adhesive may be a permanent adhesive. A second adhesive application device may be used to apply a non-resealable adhesive to a leading edge 302 of an outer label 300 (step 1210). The outer label leading edge 302 may be affixed to the inner label 100 (step 1215), for example by placing the outer label leading edge 302 in physical contact with the inner label 100 and applying pressure. A resealable adhesive may be applied from a third adhesive application device to a trailing edge 304 of the outer label 300 (step 1220). The outer label trailing edge 304 may then be releasably coupled to the outer label leading edge 302 (step 1225). In various embodiments, the resealable adhesive may allow the outer label trailing edge 304 to be repeatedly coupled and decoupled to the outer label leading edge 302, thereby revealing the inner label 100 and an outer label back surface 402 when the outer label trailing edge is decoupled. In the decoupled stage, a revealed surface space may be tripled or nearly tripled compared to the coupled stage.

Figure 13:
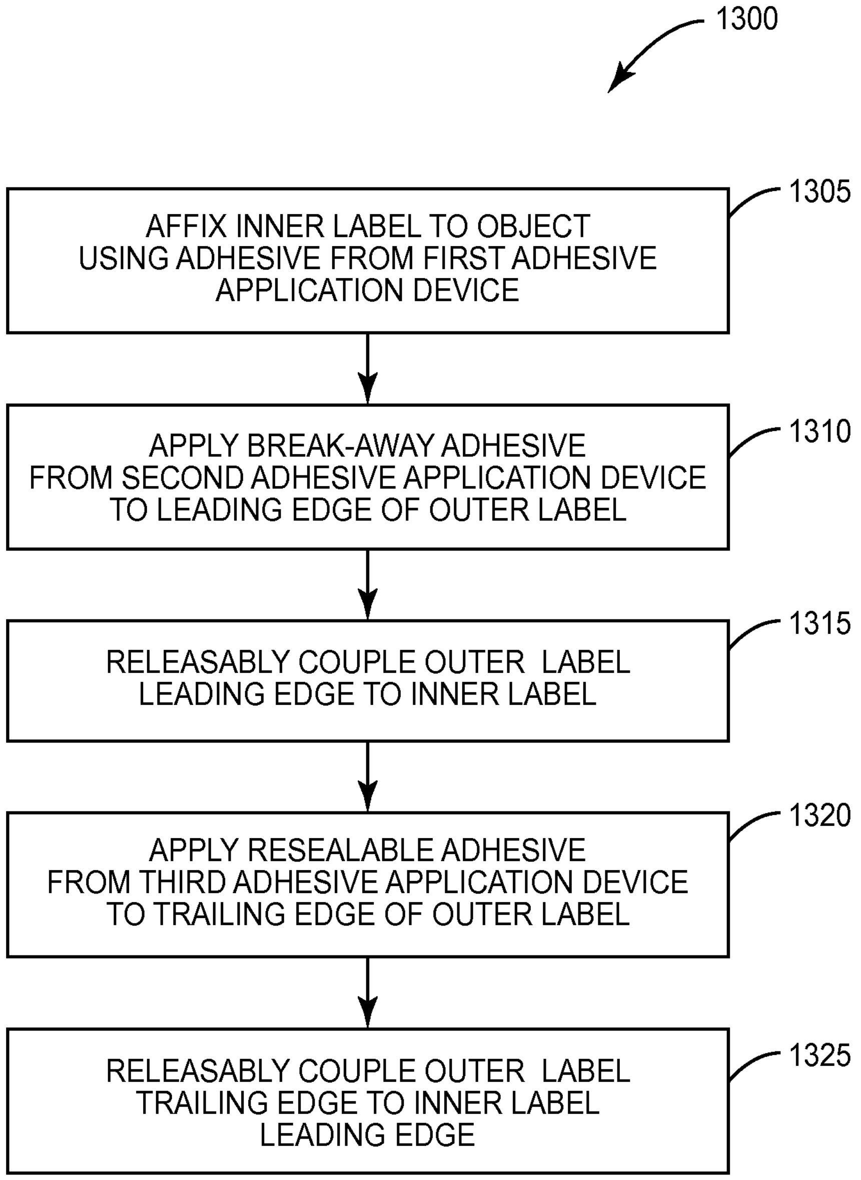
FIG. 13 is an exemplary flow diagram of a method for applying multiple labels to an object according to various embodiments.

FIG. 13 illustrates a general flow chart of various embodiments of a method 1300 for applying multiple labels to an object. The method 1300 may be employed with roll-fed labels, and various embodiments may comprise a rotatable outer label. An inner label 100 may be affixed to an object, such as a container 500, using adhesive from a first adhesive application device (step 1305). In various embodiments, the adhesive may be a permanent adhesive. A second adhesive application device may be used to apply a non-resealable adhesive to a leading edge 302 of an outer label 300 (step 1310). In various embodiments, the non-resealable adhesive may be a breakaway adhesive. The outer label leading edge 302 may be releasably coupled to the inner label 100 (step 1315), for example by placing the outer label leading edge 302 in physical contact with the inner label 100 and applying pressure. A resealable adhesive may be applied from a third adhesive application device to a trailing edge 304 of the outer label 300 (step 1320). The outer label trailing edge 304 may then be releasably coupled to the outer label leading edge 302 (step 1325).

In various embodiments of method 1300 in which the outer label leading edge adhesive 404 is a breakaway adhesive, rotation of the outer label 300 relative to the inner label 100 may cause the adhesive bond between the outer label leading edge 302 and the inner label 100 to fail. Since the outer label 300 is no longer attached to the inner label 100 (but remains wrapped around the inner label 100), the outer label 300 may be free to rotate relative to the inner label 100.

Figure 14:
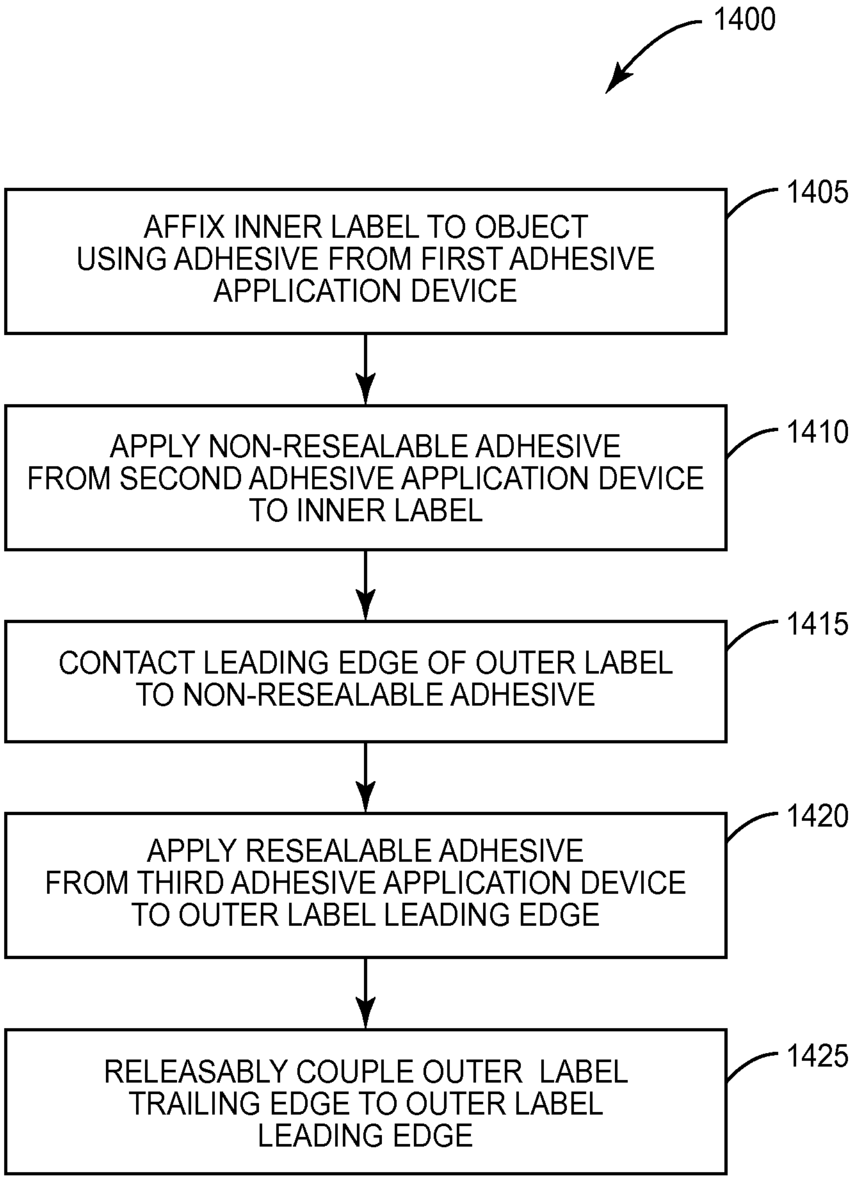
FIG. 14 is an exemplary flow diagram of a method for applying multiple labels to an object according to various embodiments.

FIG. 14 illustrates a general flow chart of various embodiments of a method 1400 for applying labels to an object. The method 1400 may be employed with cut and stack labels. An inner label 100 may be affixed to an object, such as a container 500, using adhesive from a first adhesive application device (step 1405). In various embodiments, the adhesive may be a permanent adhesive. A second adhesive application device may be used to apply a non-resealable adhesive to a front surface 108 of the inner label 100 (step 1410). The outer label leading edge 302 may be affixed to the inner label 100 (step 1415), for example by placing a back surface 402 of the outer label leading edge 302 in physical contact with the non-resealable adhesive and applying pressure. A resealable adhesive may be applied from a third adhesive application device to the outer label leading edge 302 on a front surface 306 of the outer label 300 (step 1420). The outer label trailing edge 304 may then be releasably coupled to the outer label leading edge 302 (step 1425). In various embodiments, the resealable adhesive may allow the outer label trailing edge 304 to be repeatedly coupled and decoupled to the outer label leading edge 302, thereby revealing the inner label 100 and an outer label back surface 402 when the outer label trailing edge is decoupled. In the decoupled stage, a revealed surface space may be tripled or nearly tripled compared to the coupled stage.

Figure 15:
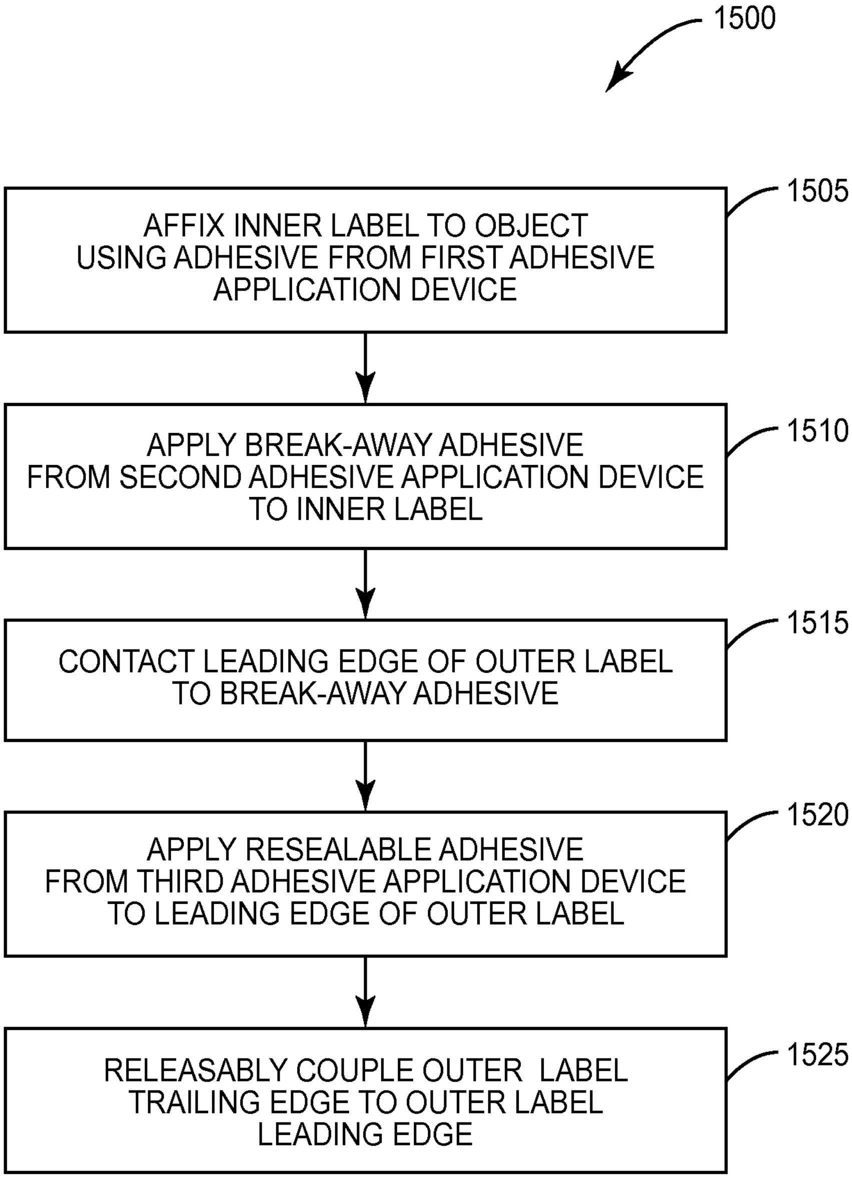
FIG. 15 is an exemplary flow diagram of a method for applying multiple labels to an object according to various embodiments.

FIG. 15 illustrates a general flow chart of various embodiments of a method 1500 for applying labels to an object. The method 1500 may be employed with cut and stack labels, and various embodiments may comprise a rotatable outer label. An inner label 100 may be affixed to an object, such as a container 500, using adhesive from a first adhesive application device (step 1505). In various embodiments, the adhesive may be a permanent adhesive. A second adhesive application device may be used to apply a non-resealable adhesive to a front surface 108 of the inner label 100 (step 1510). In various embodiments, the non-resealable adhesive may be a breakaway adhesive. The outer label leading edge 302 may be affixed to the inner label 100 (step 1515), for example by placing a back surface 402 of the outer label leading edge 302 in physical contact with the non-resealable adhesive and applying pressure. A resealable adhesive may be applied from a third adhesive application device to the outer label leading edge 302 on a front surface 306 of the outer label 300 (step 1520). The outer label trailing edge 304 may then be releasably coupled to the outer label leading edge 302 (step 1525).

In various embodiments of method 1500 in which the outer label leading edge adhesive 404 is a breakaway adhesive, rotation of the outer label 300 relative to the inner label 100 may cause the adhesive bond between the outer label leading edge 302 and the inner label 100 to fail. Since the outer label 300 is no longer attached to the inner label 100 (but remains wrapped around the inner label 100), the outer label 300 may be free to rotate relative to the inner label 100.

Spatially relative terms such as “under”, “below”, “lower”, “over”, “upper”, and the like, are used for ease of description to explain the positioning of one element relative to a second element. These terms are intended to encompass different orientations of the device in addition to different orientations than those depicted in the figures. Further, terms such as “first”, “second”, and the like, are also used to describe various elements, regions, sections, etc. and are also not intended to be limiting. Like terms refer to like elements throughout the description.

As used herein, the terms “having”, “containing”, “including”, “comprising”, and the like are open ended terms that indicate the presence of stated elements or features, but do not preclude additional elements or features. The articles “a”, “an” and “the” are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for applying multiple labels to an object, comprising:

affixing an inner label to the object using permanent adhesive from a first adhesive application device;

applying non-resealable adhesive from a second adhesive application device to a leading edge of an outer label;

affixing the outer label leading edge to the inner label;

applying resealable adhesive from a third adhesive application device to a trailing edge of the outer label; and releasably coupling the outer label trailing edge to the outer label leading edge, thereby obscuring from view at least a portion of the inner label.

2. The method of claim 1, wherein the inner label comprises an inner label back surface positioned adjacent to the object, and an inner label front surface opposite the inner label back surface.

3. The method of claim 2, wherein the outer label comprises an outer label back surface positioned adjacent to the inner label front surface, and an outer label front surface opposite the outer label back surface.

4. The method of claim 3, wherein the applying non-resealable adhesive from the second adhesive application device to the outer label leading edge comprises applying the non-resealable adhesive to the outer label back surface.

5. The method of claim 3, wherein the applying resealable adhesive from the third adhesive application device to the outer label trailing edge comprises applying the resealable adhesive to the outer label back surface.

6. The method of claim 3, wherein the resealable adhesive allows the outer label trailing edge to be repeatedly coupled and decoupled to the outer label leading edge, thereby revealing the inner label and the outer label back surface when the outer label trailing edge is decoupled, the decoupled stage tripling or nearly tripling revealed surface space in comparison to revealed surface space of the coupled stage.

7. The method of claim 2, wherein the affixing the inner label to the object comprises applying the non-resealable adhesive to at least a portion of the inner label back surface.

8. The method of claim 2, wherein the inner label front surface has indicia disposed thereon.

9. The method of claim 8, further comprising wrapping the outer label about the object prior to releasably coupling the outer label trailing edge to the outer label leading edge, thereby obscuring from view at least a portion of the indicia on the front surface of the inner label.

10. The method of claim 2, wherein the affixing the outer label leading edge to the inner label comprises affixing the outer label leading edge to the inner label front surface.

11. The method of claim 1, wherein one or two surfaces of the outer label have indicia disposed thereon.

12. The method of claim 1, wherein the releasably coupling the outer label trailing edge to the outer label leading edge further comprises covering at least a portion of the inner label with the outer label.

13. The method of claim 1, wherein the outer label further comprises a window that allows at least a portion of the inner label to be visible through the window when the outer label trailing edge is releasably coupled to the outer label leading edge.

14. The method of claim 1, further comprising separating the outer label from a roll of outer labels.

15. A method for applying multiple labels to an object, comprising:

affixing an inner label to the object using permanent adhesive from a first adhesive application device;

applying breakaway adhesive from a second adhesive application device to a leading edge of an outer label;

releasably coupling the outer label leading edge to the inner label;

applying resealable adhesive from a third adhesive application device to a trailing edge of the outer label; and releasably coupling the outer label trailing edge to the outer label leading edge, thereby obscuring from view at least a portion of the inner label.

16. The method of claim 15, wherein a front surface of the inner label has indicia disposed thereon.

17. The method of claim 15, wherein one or two surfaces of the outer label have indicia disposed thereon.

18. The method of claim 15, further comprising separating the outer label from a roll of outer labels.

19. The method of claim 15, wherein the outer label further comprises a window that allows at least a portion of the inner label to be visible through the window.

20. The method of claim 19, wherein the window is configured such that a first portion of the inner label is visible when the window is in a first position, and a second portion of the inner label is visible when the window is in a second position.

21. The method of claim 20, wherein the second portion of the inner label is obscured from view when the window is in the first position.

22. The method of claim 20, wherein the first portion of the inner label is obscured from view when the window is in the second position.

23. The method of claim 15 further comprising uncoupling the outer label leading edge and outer label trailing edge, thereby allowing the outer label to be removed from the inner label.

24. A method for applying multiple labels to an object comprising:

affixing an inner label to the object using permanent adhesive from a first adhesive application device;

applying non-resealable adhesive from a second adhesive application device to the inner label;

contacting a leading edge of an outer label with the non-resealable adhesive to secure the outer label leading edge to the inner label;

applying resealable adhesive from a third adhesive application device to the leading edge of the outer label; and releasably coupling the outer label trailing edge to the outer label leading edge, thereby obscuring from view at least a portion of the inner label.

25. The method of claim 24, wherein a front surface of the inner label has indicia disposed thereon.

26. The method of claim 25, further comprising wrapping the outer label about the object prior to releasably coupling the outer label trailing edge to the outer label leading edge, thereby obscuring from view at least a portion of the indicia on the inner label.

27. The method of claim 24, wherein one or two surfaces of the outer label have indicia disposed thereon.

28. The method of claim 24, further comprising obscuring essentially the entire inner label from view.

29. A method for applying multiple labels to an object comprising:

affixing an inner label to the object using permanent adhesive from a first adhesive application device;

applying breakaway adhesive from a second adhesive application device to the inner label;

contacting a leading edge of an outer label with the breakaway adhesive to releasably couple the outer label leading edge to the inner label;

applying resealable adhesive from a third adhesive application device to the leading edge of the outer label; and releasably coupling the outer label trailing edge to the outer label leading edge, thereby obscuring from view at least a portion of the inner label.

30. The method of claim 29, wherein a front surface of the inner label has indicia disposed thereon.

31. The method of claim 30, further comprising wrapping the outer label about the object prior to releasably coupling the outer label trailing edge to the outer label leading edge, thereby obscuring from view at least a portion of the indicia on the inner label.

32. The method of claim 29, wherein one or two surfaces of the outer label have indicia disposed thereon.

33. The method of claim 29, wherein the outer label further comprises a window that allows at least a portion of the inner label to be visible through the window.

34. The method of claim 33, wherein the window is configured such that a first portion of the inner label is visible when the window is in a first position, and a second portion of the inner label is visible when the window is in a second position.

35. The method of claim 34, wherein the second portion of the inner label is obscured from view when the window is in the first position.

36. The method of claim 34, wherein the first portion of the inner label is obscured from view when the window is in the second position.

37. The method of claim 29 further comprising uncoupling the outer label leading edge and outer label trailing edge, thereby allowing the outer label to be removed from the inner label.

* * * * *